United States Patent
Maleki et al.

(10) Patent No.: US 11,128,330 B2
(45) Date of Patent: *Sep. 21, 2021

(54) NONLINEAR SELF-INTERFERENCE CANCELLATION WITH SAMPLING RATE MISMATCH

(71) Applicant: Samsung Electronics Co., Ltd., Suwon-si (KR)

(72) Inventors: Hamed Maleki, San Diego, CA (US); Elina Nayebi, San Diego, CA (US); Pranav Dayal, San Diego, CA (US); Kee-Bong Song, San Diego, CA (US)

(73) Assignee: Samsung Electronics Co., Ltd.

( * ) Notice: Subject to any disclaimer, the term of this patent is extended or adjusted under 35 U.S.C. 154(b) by 0 days.

This patent is subject to a terminal disclaimer.

(21) Appl. No.: 16/992,702

(22) Filed: Aug. 13, 2020

(65) Prior Publication Data

US 2020/0382148 A1 Dec. 3, 2020

Related U.S. Application Data

(63) Continuation of application No. 16/440,626, filed on Jun. 13, 2019, now Pat. No. 10,797,739.

(Continued)

(51) Int. Cl.
*H04B 1/40* (2015.01)
*H04B 1/10* (2006.01)
*H04L 25/03* (2006.01)
*H04B 1/12* (2006.01)
*H04B 1/525* (2015.01)

(Continued)

(52) U.S. Cl.
CPC ............. *H04B 1/1027* (2013.01); *H04B 1/12* (2013.01); *H04B 1/525* (2013.01); *H04B 1/56* (2013.01); *H04L 5/0048* (2013.01); *H04L 5/1461* (2013.01); *H04L 25/0212* (2013.01);

(Continued)

(58) Field of Classification Search
CPC ........ H04B 1/1027; H04B 1/12; H04B 1/525; H04B 1/56; H04B 1/40; H04L 5/0048; H04L 5/1461; H04L 25/0212; H04L 25/03006; H04L 25/03019; H04L 2025/03375

See application file for complete search history.

(56) References Cited

U.S. PATENT DOCUMENTS 9,014,651 B2 4/2015 Tujkovic et al.
9,197,264 B1 11/2015 Yoo et al.

(Continued)

FOREIGN PATENT DOCUMENTS

EP 2446537 B1 7/2016
WO 02093807 A1 11/2002

*Primary Examiner* — Dac V Ha
(74) *Attorney, Agent, or Firm* — Innovation Counsel LLP

(57) ABSTRACT

A method for providing nonlinear self-interference cancellation of a wireless communication device includes: receiving digital samples of an interfering signal having a first sampling rate and a corrupted victim signal having a second sampling rate; generating a kernel vector based on the interfering signal, wherein the kernel vector has terms of nonlinear self-interference; estimating the nonlinear self-interference of the corrupted victim signal using the terms of the nonlinear self-interference; and providing an estimation of a desired signal by cancelling the nonlinear self-interference from the corrupted victim signal.

18 Claims, 3 Drawing Sheets

Related U.S. Application Data

(60) Provisional application No. 62/816,422, filed on Mar. 11, 2019.

(51) Int. Cl.
  *H04B 1/56* (2006.01)
  *H04L 5/00* (2006.01)
  *H04L 5/14* (2006.01)
  *H04L 25/02* (2006.01)

(52) U.S. Cl.
  CPC .. *H04L 25/03006* (2013.01); *H04L 25/03019* (2013.01); *H04L 2025/03375* (2013.01)

(56) References Cited

U.S. PATENT DOCUMENTS

| | | |
|---|---|---|
| 9,838,051 B1 | 12/2017 | Gupta et al. |
| 2007/0183547 A1 | 8/2007 | Fifield et al. |
| 2009/0325509 A1 | 12/2009 | Mattisson et al. |
| 2014/0126675 A1 | 5/2014 | Monsen |
| 2015/0065058 A1 | 3/2015 | Wang et al. |
| 2016/0380653 A1 | 12/2016 | Sheikh et al. |
| 2017/0026126 A1* | 1/2017 | Kpodzo ................ H04B 1/109 |
| 2017/0279480 A1 | 9/2017 | Choi et al. |
| 2017/0353288 A1* | 12/2017 | Brannon ................ H04B 1/525 |
| 2018/0131502 A1* | 5/2018 | Askar .................. H04L 5/1461 |

* cited by examiner

NONLINEAR SELF-INTERFERENCE CANCELLATION WITH SAMPLING RATE MISMATCH

CROSS-REFERENCE TO RELATED APPLICATION(S)

This application is a continuation of U.S. patent application Ser. No. 16/440,626 filed Jun. 13, 2019, which claims the benefits of and priority to U.S. Provisional Patent Application Ser. No. 62/816,422 filed Mar. 11, 2019, the disclosures of which are incorporated herein by reference in their entirety.

TECHNICAL FIELD

The present disclosure is generally related to wireless communication systems, in particular, to a system and method for providing nonlinear self-interference cancellation (NSIC) with sampling rate mismatch.

BACKGROUND

A wireless communication device such as a mobile device may include multiple radio access technologies (RATs). Examples of such RATs include, but are not limited to, long term evolution (LTE), 5th generation new radio (5G NR), Wi-Fi, Bluetooth (BT), and global navigation satellite system (GNSS).

An analog circuit including a power amplifier can create higher order components of an interfering signal, and they may land into an operating frequency band of the desired signal creating nonlinear distortion to the desired signal. Nonlinear self-interference may be caused by simultaneous transmission of the same carrier, other carriers, or other RATs on the same wireless communication device where signal reception happens on a given carrier. There may be different sources of nonlinear self-interference including harmonic interference from a single carrier or a particular RAT, inter-modulation distortion (IMD) between multiple carriers, and interference from reciprocal mixing of one or more carriers. Typically, nonlinear self-interference cancellation (NSIC) is applied when both an interfering signal and a victim (interfered) signal have a same sampling rate.

SUMMARY

According to one embodiment, a method for providing nonlinear self-interference cancellation includes: receiving digital samples of an interfering signal and a corrupted victim signal; determining that a first sampling rate of the interfering signal is lower than a second sampling rate of the corrupted victim signal; generating an interpolated interfering signal by interpolating the interfering signal to match the first sampling rate of the interfering signal to the second sampling rate of the corrupted victim signal; generating a kernel vector based on the interpolated interfering signal, wherein the kernel vector has terms of the nonlinear self-interference; estimating nonlinear self-interference of the corrupted victim signal using the terms of the nonlinear self-interference; and providing an estimation of a desired signal by cancelling the nonlinear self-interference from the corrupted victim signal.

According to another embodiment, a method for providing nonlinear self-interference cancellation includes: receiving digital samples of an interfering signal and a corrupted victim signal; determining that a first sampling rate of the interfering signal is greater than a second sampling rate of the corrupted victim signal; generating a kernel vector based on the interfering signal, wherein the kernel vector has terms of the nonlinear self-interference; estimating nonlinear self-interference of the corrupted victim signal using the terms of the nonlinear self-interference; and providing an estimation of a desired signal by cancelling the nonlinear self-interference from the corrupted victim signal.

According to another embodiment, a wireless communication device includes: a nonlinear self-interference cancellation (NSIC) logic, wherein the NSIC logic is configured to receive an interfering signal sampled at a first sampling rate and a corrupted victim signal sampled at a second sampling rate, generate a kernel vector having terms of nonlinear self-interference, estimate the nonlinear self-interference of the corrupted victim signal, and generate an estimation of a desired signal by cancelling the nonlinear self-interference from the corrupted victim signal.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

Figure 1:
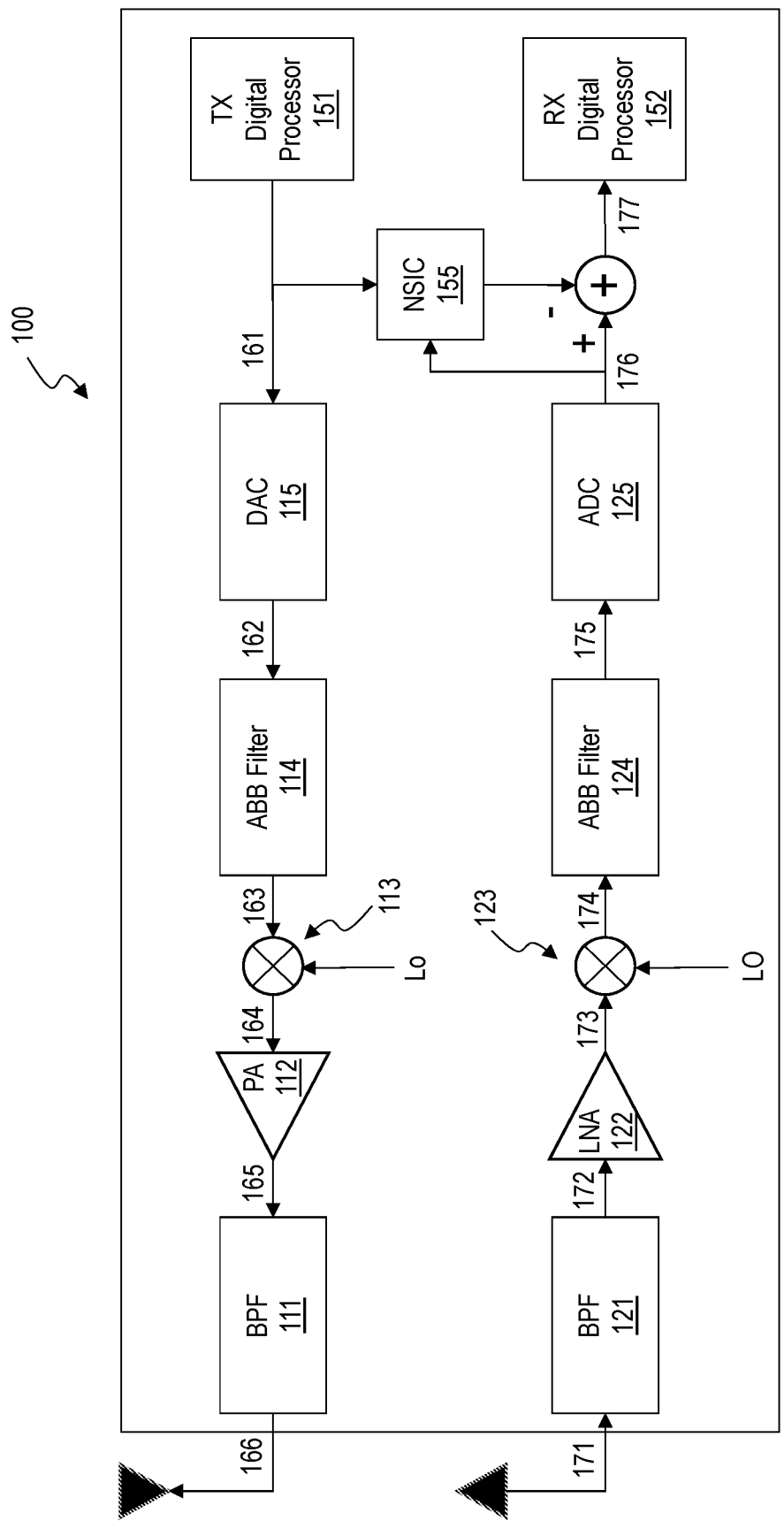
FIG. 1 is a simplified block diagram of an example system, according to one embodiment.

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Each of the features and teachings disclosed herein can be utilized separately or in conjunction with other features and teachings to provide nonlinear self-interference cancellation (NSIC) with sampling rate mismatch. Representative examples utilizing many of these additional features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are used by those skilled in the data processing arts to effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of an original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

The present disclosure proposes an equalization technique when sampling rates of an interfering signal and a desired signal are different from each other. Herein, a victim signal refers to a signal that is corrupted or interfered by the interfering signal, and its nonlinear self-interference is to be equalized or cancelled by the present equalization technique. In particular, the present disclosure provides an explicit equalization technique in each of the cases when the sampling rate of the desired signal is greater than that of the interfering signal and the sampling rate of the desired signal is lower than that of the interfering signal.

FIG. 1 is a simplified block diagram of an example system, according to one embodiment. The system 100 includes a transmitter digital processor 151, a receiver digital processor 152, and a nonlinear self-interference cancellation (NSIC) circuit 155.

The system 100 transmits digital signals in the following signal transmission path. The transmitter digital processor 151 sends a digital signal 161 to a digital-to-analog converter (DAC) 115. The DAC 115 converts the digital signal 161 to a baseband signal 162, and an analog baseband (ABB) filter 114 filters out the baseband signal 162 to obtain a filtered baseband signal 163. For example, the ABB filter 114 is a low-pass filter that removes high frequency components of the baseband signal 162. An up-conversion mixer 113 mixes the filtered baseband signal 163 with a local oscillator (LO) signal and generates a radio frequency (RF) signal 164. A power amplifier (PA) 112 amplifies the RF signal 164, a band pass filter (PBF) 111 filters an amplified RF signal 165, and an amplified/filtered RF signal 166 is transmitted via an antenna.

The system 100 receives RF signals in the following signal reception path. An RF signal 171 is received by an antenna, and a band pass filter (PBF) 121 filters the RF signal 171 to generate a band-pass filtered signal 172. A low noise amplifier (LNA) 122 amplifies the band-pass filtered signal 172, and a down-conversion mixer 123 converts an amplified low-noise signal 173 to a baseband signal 174 by mixing with a local oscillator (LO) signal. An analog baseband (ABB) filter 124 filters out the baseband signal 174 to obtain a filtered baseband signal 175. An analog-to-digital converter (ADC) 125 converts the filtered baseband signal 175 to a digital signal 176. The NSIC circuit 155 cancels nonlinear self-interference component of the digital signal 176, and the receiver digital processor 152 receives an interference-canceled digital signal 177.

An example of the system 100 is a wireless communication device such as a mobile device. The system 100 may include multiple radio access technologies (RATs) on the device such as long term evolution (LTE), 5th generation new radio (5G NR), Wi-Fi, Bluetooth (BT), and global navigation satellite system (GNSS).

According to one embodiment, the NSIC circuit 155 performs nonlinear self-interference cancellation using digital samples of an interfering signal (e.g., the digital signal 161 input to the DAC 115) and digital samples of an interfered signal (e.g., the digital signal 176 output from the ADC 125). However, the sampling rates of input signals to the NSIC circuit 155 (e.g., the digital signals 161 and 176) may be different from each other. The system 100 may perform nonlinear self-interference cancellation differently based on the sampling rates of the interfering signal and the interfered signal (also referred to as a corrupted victim signal) that is corrupted by the interfering signal.

According to one embodiment, the NSIC circuit 155 may perform nonlinear self-interference cancellation when a sampling rate of digital samples of the interfering signal (e.g., the digital signal 161) is lower than a sampling rate of the digital samples of the corrupted victim signal (e.g., the digital signal 176). In this case, the system 100 may perform interpolation on the interfering signal to make the sampling rate of the interfering signal and that of the corrupted victim signal to be the same and then perform estimation of the nonlinear self-interference signal.

According to another embodiment, the NSIC circuit 155 may perform nonlinear self-interference cancellation when the sampling rate of digital samples of the interfering signal is greater than that of the digital samples of the corrupted victim signal. When a bandwidth of the nonlinear self-interference signal is comparable to that of the desired signal such that aliasing due to analog-to-digital conversion is negligible, the NSIC circuit 155 may decimate the digital samples of the interfering signal to make the sampling rates of the interfering signal and that of the corrupted victim signal to be the same and then perform estimation of the nonlinear self-interference signal. When the bandwidth of the nonlinear self-interference signal is greater than that of the desired signal such that aliasing of the interfering signal happens due to analog-to-digital conversion, the NSIC circuit 155 may frequency shift the interfering signal that occupies a range of frequencies and decimate each aliasing portion separately to make the sampling rates of the interfering signal and the corrupted victim signal the same and then perform estimation of the nonlinear self-interference signal using in-band and all out-of-band portions of the interfering signal that fold back into a desired band, i.e., a frequency band of the desired signal.

According to one embodiment, the present system may process nonlinear self-interference cancellation in real-time. In this case, the digital samples of the interfering signal and the digital samples of the corrupted victim signal must be available to the present system for real-time processing. In general, the digital samples of the interfering signal and the desired signal are assumed to be uncorrelated.

The corrupted victim signal $y_r[n]$ may be represented as:

$$y_r[n]=y[n]+d[n]+w[n], \quad \text{(Eq. 1)}$$

where d[n] denotes a desired signal, w[n] denotes an additive noise, and y[n] denotes a nonlinear self-interference signal that is to be estimated and canceled by the NSIC circuit 155 of FIG. 1. The nonlinear self-interference signal y[n] may be generated due to the transmission of the same carrier, other carriers, or other RATs on the same device (e.g., the system 100).

For example, the nonlinear self-interference signal y[n] is generated after passing an interfering signal x[n] through the nonlinearity, and it interferes with the desired signal d[n]. The output of the nonlinearity is referred to as y[n] in (Eq. 1) above that is the nonlinear self-interference signal of the interfering signal x[n]. Suppose the digital samples of the interfering signal x[n] prior to passing through the nonlinearity and the digital samples $y_r[n]$ are available for real-time processing. However, a sampling rate $F_D$ of the digital samples of the corrupted victim signal $y_r[n]$ and a sampling rate $F_I$ of the digital samples of the interfering signal x[n] may be different from each other. In other words, the digital samples of the corrupted victim signal $y_r[n]$ and the digital samples of the interfering signal x[n] have sampling frequencies of $F_D$ and $F_I$ respectively.

According to one embodiment, the NSIC 155 can estimate the nonlinear self-interference from two or more interfering signals jointly. The NSIC 155 may apply the nonlinear self-interference cancelation for the interfering signals together or in a serial manner.

It is assumed that the nonlinear self-interference signal y[n] can be represented (estimated) as follows at the time of nonlinear self-interference coefficients estimation and generation:

$$y_{est}[n]=z(n)_{1 \times M} C_{est_{M \times 1}}, \quad \text{(Eq. 2)}$$

where $C_{est_{M \times 1}}$ is a column vector of nonlinear coefficients, $z(n)_{1 \times M}$ is a row vector of different components of the nonlinearity that is referred to as a kernel vector, M is the number of the nonlinear components. The row vector z(n) is generated based on the type of nonlinearity.

Figure 2:
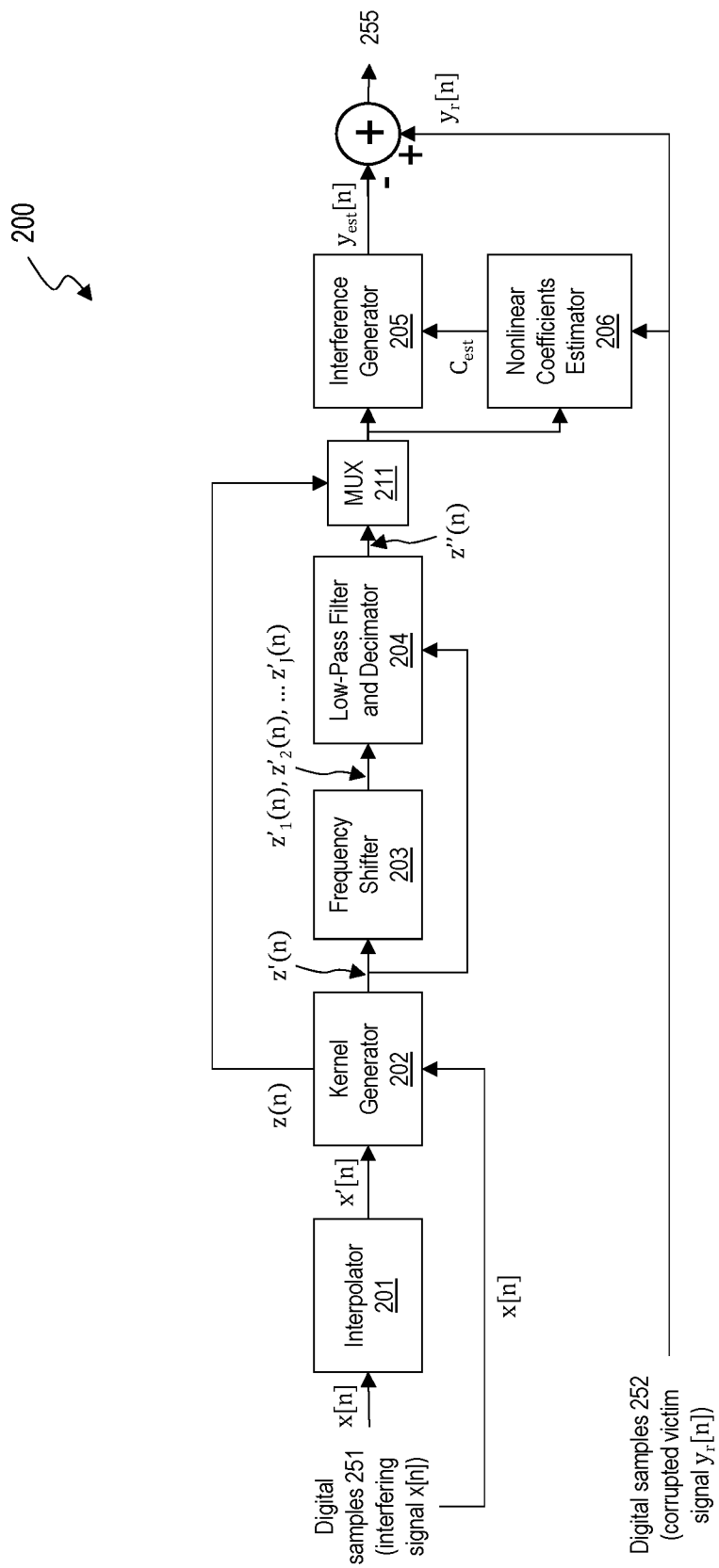
FIG. 2 illustrates a block diagram of an example NSIC system, according to one embodiment.

FIG. 2 illustrates a block diagram of an example NSIC system, according to one embodiment. The NSIC system 200 includes an interpolator 201, a kernel generator 202, a frequency shifter 203, a low-pass filter and decimator 204, a multiplexer 211, a nonlinear self-interference generator 205, and a nonlinear self-interference coefficients estimator 206. The NSIC system 200 receives two different digitally sampled signals, for example, digital samples 251 of the interfering signal x[n] and digital samples 252 of the corrupted victim signal $y_r[n]$, and provides an output signal 255 to a demodulator (not shown), for example, the receiver digital processor 152 of FIG. 1. Referring to (Eq. 1), the output signal 255 may be treated as an estimation of the desired signal d[n] when the additive noise w[n] is negligible.

The NSIC system 200 may correspond to the NSIC circuit 155 of FIG. 1 or at least a portion thereof. The NSIC system 200 may be implemented in a hardware circuit including a logic component and/or device, a software running on a processor/controller, a firmware, or any combination thereof. Although the NSIC circuit 155 is described as a circuit in FIG. 1, the NSIC circuit 155 may be implemented in a hardware circuit including a logic component and/or device, a software running on a processor/controller, a firmware, or any combination thereof similarly to the NSIC system 200. It is understood that the actual implementation of the NSIC circuit 155 and the NSIC system 200 may be varied without deviating from the scope of the present disclosure.

According to one embodiment, the NSIC system 200 may perform nonlinear self-interference cancellation when a sampling rate $F_I$ of digital samples 251 of the interfering signal x[n] is lower than a sampling rate $F_D$ of digital samples 252 of the corrupted victim signal $y_r[n]$ (when $F_D > F_I$).

The interpolator 201 may receive the digital samples 251 of the interfering signal x[n] and generate interpolated version of the interfering signal x[n]. The interpolated version of the interfering signal x[n] is herein referred to as an interpolated interfering signal x'[n]. The kernel generator 202 may receive the interpolated interfering signal x'[n] and generate the kernel vector z(n). The NSIC system 200 later determines the nonlinear self-interference signal y[n] of (Eq. 1) as a function of the interpolated interfering signal x'[n]. As an example, the estimated nonlinear self-interference signal $y_{est}[n]$ may be represented as follows in a nonlinear model when there are different harmonics of signal self-interfering with the corrupted victim signal $y_r[n]$ in the principal frequency:

$$y_{est}[n] = \sum_{k=0}^{K-1} \sum_{l=-L}^{L} C_{k,l} |x'[n-l]|^{2k} x'[n-l] \quad \text{(Eq. 3)}$$

Then, for this example, the number of the nonlinear components M, the kernel vector z(n), and the column vector $C_{est}$ may be expressed as follows, where 2L+1 is the memory length, and K is the order of nonlinearity:

$$M = K(2L+1)$$
$$z(n) = [x'[n+L] \ldots x'[n-L] \ldots |x'[n+L]|^{2(K-1)}$$
$$x'[n+L] \ldots |x'[n-L]|^{2(K-1)} x'[n-L]]_{1 \times K(2L+1)}$$

-continued $$C_{est} = \begin{bmatrix} C_{0,-L} \\ \vdots \\ C_{0,L} \\ \vdots \\ C_{K-1,-L} \\ \vdots \\ C_{K-1,L} \end{bmatrix}_{K(2L+1) \times 1}$$

In the present embodiment, the NSIC system 200 uses the digital samples 252 of the corrupted victim signal $y_r[n]$ as well as the kernel vector $z(n)$ for performing nonlinear self-interference cancellation. By estimating the nonlinear self-interference signal $y[n]$, the NSIC system 200 may cancel the nonlinear self-interference $y[n]$ from the corrupted victim signal $y_r[n]$ to obtain the estimation of the desired signal (e.g., the output signal 255).

In one embodiment, the interpolator 201 may interpolate the interfering signal $x[n]$ to make the sampling rate of the interfering signal $x[n]$ to be the same as that of the corrupted victim signal $y_r[n]$. As an example of the interpolation scheme, the interpolator 201 may employ Lagrange interpolation where its order depends on a size of oversampling. However, it is understood that the interpolator 201 may employ a different interpolation scheme without deviating from the scope of the present disclosure.

After interpolating the digital samples 251 of the interfering signal $x[n]$, the kernel generator 202 may generate the kernel vector $z(n)$ using the interpolated interfering signal $x'[n]$ that is output from the interpolator 201 to estimate the nonlinear self-interference signal $y[n]$. In the present embodiment (when $F_D > F_I$), the kernel vector $z(n)$ that is output from the kernel generator 202 is fed to the nonlinear self-interference generator 205 and the nonlinear self-interference coefficient estimator 206 through the multiplexer 211. In one embodiment, the frequency shifter 203 and the low-pass filter and decimator 204 may bypass the kernel vector $z(n)$ to the nonlinear self-interference generator 205 and the nonlinear self-interference coefficients estimator 206. For the convenience of explanation, the kernel vector that is fed to the nonlinear self-interference generator 205 and the nonlinear self-interference coefficients estimator 206 through the frequency shifter 203 and the low-pass filter and decimator 204 is denoted as $z''(n)$.

The nonlinear self-interference coefficient estimator 206 may generate the estimated nonlinear coefficient column vector $C_{est_{M \times 1}}$ using the digital samples of the corrupted victim signal $y_r[n]$ and the kernel vector $z(n)$. Estimation of the nonlinear coefficient column vector $C_{est_{M \times 1}}$ may be obtained using various estimation schemes, for example, a least square (LS) scheme, i.e., $$\min_{C_{est}} \|y_{est} - y_r\|^2,$$

or a recursive LS (RLS) scheme. Regardless of the estimation scheme, it is desirable to minimize an estimation error of the nonlinearity output. The interference generator 205 may generate the estimated nonlinear self-interference signal $y_{est}[n]$ using the estimated nonlinear coefficient column vector $C_{est_{M \times 1}}$ and the kernel vector $z(n)$.

According to another embodiment, the NSIC system 200 may perform nonlinear self-interference cancellation when a sampling rate of the digital samples 251 of the interfering signal $x[n]$ is greater than a sampling rate of the digital samples 252 of the corrupted victim signal $y_r[n]$ (when $F_D < F_I$). In this case, the interfering signal $x[n]$ is fed to the kernel generator 202 bypassing the interpolator 201, and the kernel generator 202 may generate the kernel vector $z'(n)$ based on the interfering signal $x[n]$.

In one embodiment, if an aliasing effect is negligible, for example, if a bandwidth of the interference signal $y[n]$ is equal to or smaller than a bandwidth of the desired signal $d[n]$, the NSIC system 200 may decimate the interfering signal $x[n]$ to make the sampling rates of the interfering signal $x[n]$ and the corrupted victim signal $y_r[n]$ to be the same, and then the NISC system 200 may perform estimation of the nonlinear self-interference signal $y[n]$. More specifically, the low-pass filter and decimator 204 decimates the kernel vector $z'(n)$ to obtain the kernel vector $z''(n)$ and use it for estimation using the nonlinear self-interference generator 205 and the nonlinear self-interference coefficient estimator 206 as discussed above. In this case, the frequency shifter 203 is bypassed, and the kernel vector $z'(n)$ is fed to the low-pass filter and decimator 204, i.e., the kernel vector $z''(n)$ is a decimated version of the kernel vector $z'(n)$.

In another embodiment, if an aliasing effect is negligible, the NSIC system 200 may interpolate the digital samples 252 of the corrupted victim signal $y_r[n]$ and generate an interpolated corrupted victim signal denoted by $y_r'[n]$. The NSIC system 200 uses the kernel vector $z'(n)$ and the interpolated corrupted victim signal $y_r'[n]$ to obtain the estimated nonlinear self-interference signal $y_{est}[n]$. For the specific example where there are different harmonics of signal self-interfering with the corrupted victim signal $y_r[n]$ in the principal frequency, the kernel vector $z'(n)$ is obtained using (Eq. 4) below. The NSIC system 200 may further filter and decimate $y_{est}[n]$ and obtain the filtered, decimated signal denoted by $y_{est}'[n]$ that has sampling rate equal to $F_D$. The NSIC system 200 then subtracts $y_{est}'[n]$ from $y_r[n]$.

If the bandwidth of the nonlinear self-interference signal $y[n]$ is greater than the bandwidth of the desired signal $d[n]$ such that considerate amount of aliasing of the interfering signal happens, or in other words the down-conversion in the ADC 125 folds back out-of-band portions of interference signal into the band of the desired signal $d[n]$, the NSIC system 200 may generate the kernel vector $z'(n)$ based on the interfering signal $x[n]$. For the specific example where there are different harmonics of signal self-interfering with the corrupted victim signal $y_r[n]$ in the principal frequency, the kernel vector $z'(n)$ is constructed as follows:

$$z'(n) = [x[n+L] \ldots x[n-L] \ldots |x[n+L]|^{2(K-1)} \\ x[n+L] \ldots |x[n-L]|^{2(K-1)} x[n-L]]_{1 \times K(2L+1)} \quad \text{(Eq. 4)}$$

When the aliasing effect is significant, the frequency shifter 203 may frequency shift the kernel vector $z'(n)$ by $\theta_1 F_D, \theta_2 F_D, \ldots, \theta_J F_D$ and generate frequency-shifted kernels denoted by $z'_1(n), \ldots, z'_J(n)$, where $F_D$ is the sampling frequency of the desired signal $d[n]$, and $\theta_j$ is defined as:

$$\theta_j = (-1)^{j+1} \left\lfloor \frac{j}{2} \right\rfloor, j = 1, \ldots, J. \quad \text{(Eq. 5)}$$

The value of J is determined based on the bandwidth of the nonlinear self-interference signal $y[n]$, the sampling frequency $F_D$, and/or the nonlinearity model for each scenario. It is noted that $j=1$ in (Eq. 5) corresponds to the in-band portion of the kernel vector $z'(n)$, and each of j=2, ..., J corresponds to a different out-of-band portion of the kernel vector z'(n) that folds back into the desired band when down-sampling of the interfering signal x[n] happens at the ADC 125 of FIG. 1. It is further noted that frequency shifting of the kernel vector z'(n) by $\theta_j F_D$ brings the jth aliasing portion of the kernel vector z'(n) into the desired band.

The low-pass filter and decimator 204 may further decimate the frequency-shifted kernel vector $z'_j(n)$, j=1, ..., J to make the sampling rates of them to be the same as d[n] or $y_r[n]$ and obtain a filtered and decimated kernel vector $z_j''(n)$, j=1, ..., J. It is noted that in all decimation stages, the NSIC system 200 may use an anti-aliasing filter before down-sampling. The stacked version of the decimated kernel vector may be denoted as $z''(n)=[z_1''(n), ..., z_J''(n)]$. Then, at the time of nonlinearity estimation, the estimated nonlinear signal used for model fitting may be expressed as follows:

$$y_{est}[n] = z''(n)_{1 \times (MJ)} C_{est(MJ) \times 1}$$

where $y_{est}[n]$ is the estimated version of the nonlinear self-interference signal y[n], and M is the assumed number of nonlinear components for each kernel vector $z_j''(n)$ at the time of estimation. $C_{est(MJ) \times 1}$ and consequently the signal $y_{est}[n]$ may be estimated via any estimation method such as LS or RLS. According to one embodiment, the NSIC system 200 may determine whether to include aliasing terms in nonlinear self-interference estimation based on various factors such as an interference power relative to the desired signal d[n], a bandwidth of the nonlinear self-interference signal y[n] compared to a sampling rate of the desired signal d[n].

Figure 3:
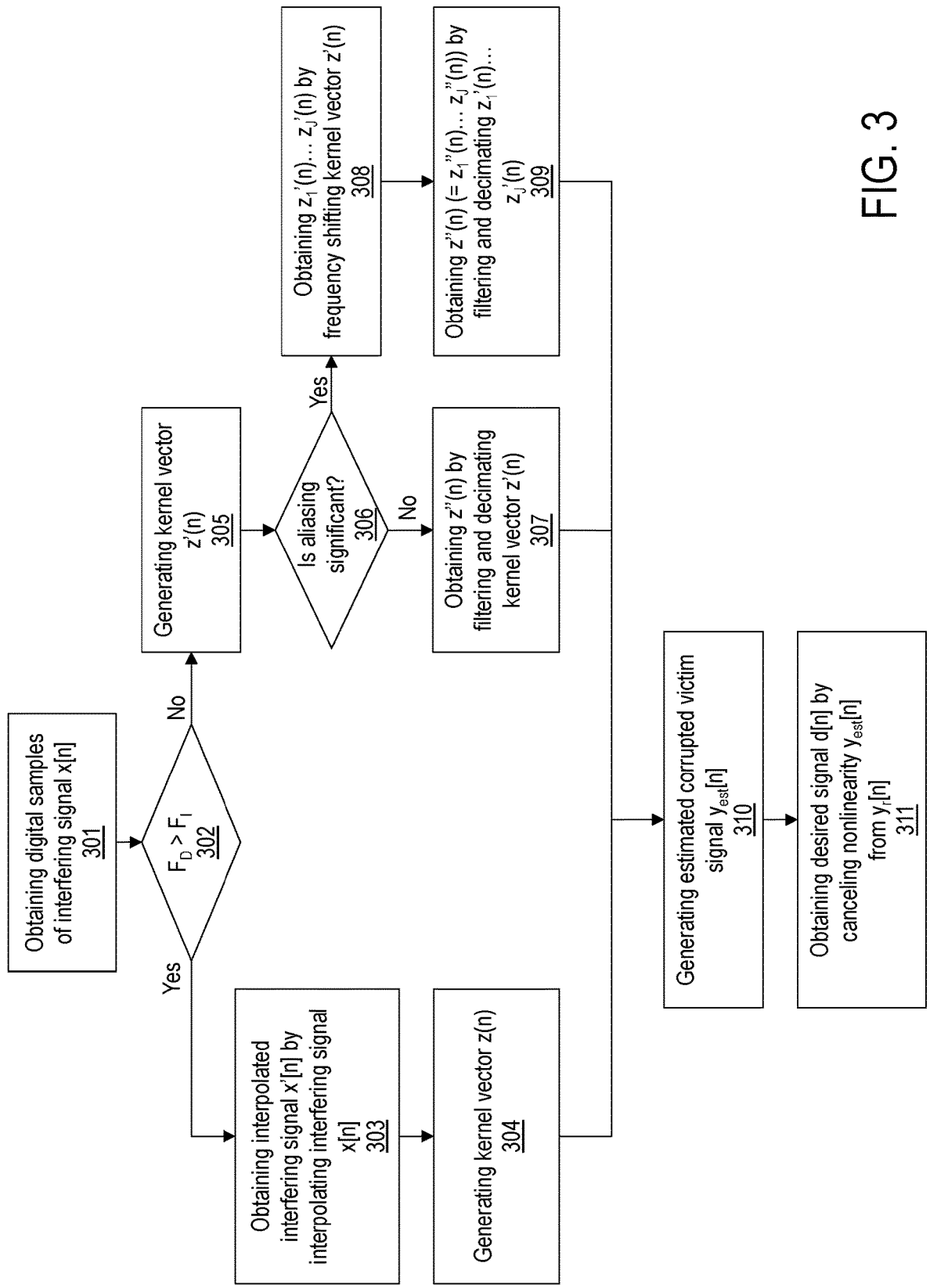
FIG. 3 illustrates a flow chart of an exemplary nonlinear self-interference cancellation (NISC) process, according to one embodiment.

FIG. 3 illustrates a flow chart of an exemplary nonlinear self-interference cancellation (NISC) process, according to one embodiment. First, digital samples of the corrupted victim signal $y_r[n]$ and digital samples of the interfering signal x[n] are obtained (301). Then, it is determined whether the sampling rate $F_D$ of the digital samples of the corrupted victim signal $y_r[n]$ is greater or lower than the sampling rate F of the digital samples of the interfering signal x[n] (302). If $F_D > F_I$, the digital samples of the interfering signal x[n] is interpolated, and interpolated interfering signal x'[n] is obtained (303), the kernel vector z(n) is generated (304). If $F_D < F_I$, the kernel vector z'(n) is generated using the interfering signal x[n] (305), and it is determined whether aliasing is significant or not (306). If aliasing is significant, frequency-shifted kernel vectors $z'_1(n), ..., z'_J(n)$ are generated by frequency shifting the kernel vector z'(n) (308), and the decimated kernel vector z''(n) is obtained by decimating $z'_j(n)$, j=1, ..., J (309). Otherwise, i.e., if aliasing is insignificant, the output and the input of the frequency shifter 203 is the same, or the frequency shifter 203 may be bypassed, and the decimated kernel vector z''(n) is obtained by decimating the kernel vector z'(n) (307).

The kernel vector z(n) (in the case of $F_D > F_I$) or the decimated kernel vector z''(n) (in the case of $F_D < F_I$) and the digital samples of the corrupted victim signal $y_r[n]$ are used to estimate the nonlinear coefficients, and the estimated nonlinear self-interference signal $y_{est}[n]$ is obtained (310). The estimation of the desired signal d[n] is obtained by canceling the estimated nonlinear self-interference signal $y_{est}[n]$ from the digital samples of the corrupted victim signal $y_r[n]$ (311).

According to one embodiment, a method for providing nonlinear self-interference cancellation of a wireless communication device includes: receiving digital samples of an interfering signal and a corrupted victim signal; determining that a first sampling rate of the interfering signal is lower than a second sampling rate of the corrupted victim signal; generating an interpolated interfering signal by interpolating the interfering signal to match the first sampling rate of the interfering signal to the second sampling rate of the corrupted victim signal; generating a kernel vector based on the interpolated interfering signal, wherein the kernel vector has terms of the nonlinear self-interference; estimating nonlinear self-interference of the corrupted victim signal using the terms of the nonlinear self-interference; and providing an estimation of a desired signal by cancelling the nonlinear self-interference from the corrupted victim signal.

The method may further include: estimating nonlinear coefficients of the nonlinear self-interference; and generating an estimated nonlinear self-interference signal based on the kernel vector and the nonlinear coefficients. The estimation of the desired signal may be provided by canceling the estimated nonlinear self-interference signal from the corrupted victim signal.

The nonlinear coefficients may be generated using a least square (LS) scheme or a recursive LS (RLS) scheme.

The interpolated interfering signal may be generated by Lagrange interpolation.

The interfering signal may be received from a transmitter of the wireless communication device, and the estimation of the desired signal may be fed into a receiver of the wireless communication device.

The corrupted victim signal may be provided by an analog-to-digital converter (ADC) coupled to the receiver.

According to another embodiment, a method for providing nonlinear self-interference cancellation includes: receiving digital samples of an interfering signal and a corrupted victim signal; determining that a first sampling rate of the interfering signal is greater than a second sampling rate of the corrupted victim signal; generating a kernel vector based on the interfering signal, wherein the kernel vector has terms of the nonlinear self-interference; estimating nonlinear self-interference of the corrupted victim signal using the terms of the nonlinear self-interference; and providing an estimation of a desired signal by cancelling the nonlinear self-interference from the corrupted victim signal.

The method may further include: determining power of an aliasing portion of the interfering signal is greater than a threshold; generating frequency-shifted kernels by frequency-shifting the kernel vector and bringing each aliasing portion into a desired band associated with the desired signal; generating a decimated kernel vector by filtering and decimating the frequency-shifted kernels to match a third sampling rate of the frequency-shifted kernel to the second sampling rate of the corrupted victim signal; and generating the nonlinear self-interference based on the decimated kernel vector.

The method may further include: determining power of an aliasing portion of the interfering signal is smaller than a threshold; generating a decimated kernel vector by filtering and decimating the kernel vector; and generating the nonlinear self-interference based on the decimated kernel vector.

The interfering signal may be received from a transmitter of the wireless communication device, and the estimation of the desired signal may be fed into a receiver of the wireless communication device.

The corrupted victim signal may be provided by an analog-to-digital converter (ADC) coupled to the receiver.

According to another embodiment, a wireless communication device includes: a nonlinear self-interference cancellation (NSIC) logic, wherein the NSIC logic is configured to receive an interfering signal sampled at a first sampling rate and a corrupted victim signal sampled at a second sampling rate, generate a kernel vector having terms of nonlinear self-interference, estimate nonlinear self-interference of the corrupted victim signal, and generate an estimation of a desired signal by cancelling the nonlinear self-interference from the corrupted victim signal.

The wireless communication device may further include a transmitter and a receiver, wherein the interfering signal is received from the transmitter, and the estimation of the desired signal is fed into the receiver.

The wireless communication device may further include an analog-to-digital converter (ADC) coupled to the receiver, wherein the ADC provides the corrupted victim signal.

The NSIC logic may include an interpolator that generates an interpolated interfering signal by interpolating the interfering signal to match the first sampling rate of the interfering signal to the second sampling rate of the corrupted victim signal.

The NSIC logic may include a kernel generator that generates the kernel vector having terms of the nonlinear self-interference.

The NSIC logic may further include a nonlinear self-interference generator and a nonlinear self-interference coefficients estimator, wherein the nonlinear self-interference coefficients estimator may estimate nonlinear coefficients of the nonlinear self-interference, and wherein the nonlinear self-interference generator may generate an estimated nonlinear self-interference signal based on the kernel vector and the nonlinear coefficients.

The NSIC logic may generate the estimation of the desired signal by canceling the estimated nonlinear self-interference signal from the corrupted victim signal.

The NSIC logic may further include a frequency shifter and a low-pass filter and decimator.

If the NSIC logic determines that power of an aliasing portion of the interfering signal is greater than a threshold, the frequency shifter may generate frequency-shifted kernels by frequency-shifting the kernel vector and bringing each aliasing portion into a desired band associated with the desired signal, and the low-pass filter and decimator may generate a decimated kernel vector by filtering and decimating the frequency-shifted kernel to match a third sampling rate of the frequency-shifted kernel to the second sampling rate of the corrupted victim signal, and the NSIC logic may generate the nonlinear self-interference based on the decimated kernel vector.

If the NSIC logic determines that power of an aliasing portion of the interfering signal is smaller than a threshold, the low-pass filter and decimator may generate a decimated kernel vector by filtering and decimating the kernel vector; and the NSIC logic may generate the nonlinear self-interference based on the decimated kernel vector.

The above example embodiments have been described hereinabove to illustrate various embodiments of implementing a system and method for providing a system and method for providing nonlinear self-interference cancellation (NSIC) with sampling rate mismatch. Various modifications and departures from the disclosed example embodiments will occur to those having ordinary skill in the art. The subject matter that is intended to be within the scope of the present disclosure is set forth in the following claims.

What is claimed is:

1. A method comprising:
receiving digital samples of an interfering signal and a corrupted victim signal;
determining that a first sampling rate of the interfering signal is lower than a second sampling rate of the corrupted victim signal;
generating an interpolated interfering signal by interpolating the interfering signal to match the first sampling rate of the interfering signal to the second sampling rate of the corrupted victim signal;
estimating nonlinear self-interference of the corrupted victim signal using the interpolated interfering signal; and
providing an estimation of a desired signal by cancelling the nonlinear self-interference from the corrupted victim signal.

2. The method of claim 1, further comprising:
generating a kernel vector based on the interpolated interfering signal;
estimating nonlinear coefficients of the nonlinear self-interference; and
generating an estimated nonlinear self-interference signal based on the kernel vector and the nonlinear coefficients,
wherein the estimation of the desired signal is provided by canceling the estimated nonlinear self-interference signal from the corrupted victim signal.

3. The method of claim 2, wherein the nonlinear coefficients are generated using a least square (LS) scheme or a recursive LS (RLS) scheme.

4. The method of claim 1, wherein the interpolated interfering signal is generated by Lagrange interpolation.

5. The method of claim 1, wherein the interfering signal is received from a transmitter of a wireless communication device, and the estimation of the desired signal is provided to a receiver of the wireless communication device.

6. The method of claim 5, wherein the corrupted victim signal is provided by an analog-to-digital converter (ADC) coupled to the receiver.

7. A method comprising:
receiving digital samples of an interfering signal and a corrupted victim signal;
determining that a first sampling rate of the interfering signal is greater than a second sampling rate of the corrupted victim signal;
generating an estimated nonlinear self-interference signal using the digital samples of the interfering signal and the corrupted victim signal by matching the first sampling rate of the interfering signal to the second sampling rate of the corrupted victim signal; and
providing an estimation of a desired signal by cancelling the estimated nonlinear self-interference signal from the corrupted victim signal.

8. The method of claim 7, further comprising:
generating a kernel vector based on the digital samples of the interfering signal by matching the first sampling rate of the interfering signal to the second sampling rate of the corrupted victim signal;
determining power of an aliasing portion of the interfering signal is greater than a threshold;
generating frequency-shifted kernels by frequency-shifting the kernel vector and bringing each aliasing portion into a desired band associated with the desired signal;
generating a decimated kernel vector by filtering and decimating the frequency-shifted kernel to match a third sampling rate of the frequency-shifted kernel to the second sampling rate of the corrupted victim signal; and
generating the nonlinear self-interference based on the decimated kernel vector.

9. The method of claim 7, further comprising:
generating a kernel vector based on the digital samples of the interfering signal by matching the first sampling rate of the interfering signal to the second sampling rate of the corrupted victim signal;
determining power of an aliasing portion of the interfering signal is smaller than a threshold;
generating a decimated kernel vector by filtering and decimating the kernel vector; and
generating the nonlinear self-interference based on the decimated kernel vector.

10. The method of claim 7, wherein the interfering signal is received from a transmitter of a wireless communication device, and the estimation of the desired signal is provided to a receiver of the wireless communication device.

11. The method of claim 10, wherein the corrupted victim signal is provided by an analog-to-digital converter (ADC) coupled to the receiver.

12. A wireless communication device comprising a logic,
wherein the logic receives digital samples of an interfering signal sampled at a first sampling rate and a corrupted victim signal sampled at a second sampling rate, the first sampling rate being greater than the second sampling rate, and
wherein the logic generates an estimated nonlinear self-interference signal using the digital samples of the interfering signal and the corrupted victim signal by matching the first sampling rate of the interfering signal to the second sampling rate of the corrupted victim signal and generates an estimation of a desired signal by cancelling the estimated nonlinear self-interference signal from the corrupted victim signal.

13. The wireless communication device of claim 12, further comprising a transmitter and a receiver, wherein the interfering signal is received from the transmitter, and the estimation of the desired signal is provided to the receiver.

14. The wireless communication device of claim 13, further comprising an analog-to-digital converter (ADC) coupled to the receiver, wherein the ADC provides the corrupted victim signal.

15. The wireless communication device of claim 12, wherein the logic comprises an interpolator that generates an interpolated interfering signal by interpolating the interfering signal to match the first sampling rate of the interfering signal to the second sampling rate of the corrupted victim signal.

16. The wireless communication device of claim 12, wherein the logic generates the estimation of the desired signal by canceling the estimated nonlinear self-interference signal from the corrupted victim signal.

17. The wireless communication device of claim 16,
wherein the logic further comprises a frequency shifter,
wherein the logic further generates a kernel vector based on the digital samples of the interfering signal by matching the first sampling rate of the interfering signal to the second sampling rate of the corrupted victim signal,
wherein, in a case where the logic determines that power of an aliasing portion of the interfering signal is greater than a threshold, the frequency shifter generates frequency-shifted kernels by frequency-shifting the kernel vector and bringing each aliasing portion into a desired band associated with the desired signal, and the low-pass filter and decimator generates a decimated kernel vector by filtering and decimating the frequency-shifted kernels to match a third sampling rate of the frequency-shifted kernel to the second sampling rate of the corrupted victim signal, and
wherein the logic generates the nonlinear self-interference based on the decimated kernel vector.

18. The wireless communication device of claim 16,
wherein the logic further comprises a low-pass filter and decimator,
wherein the logic further generates a kernel vector based on the digital samples of the interfering signal by matching the first sampling rate of the interfering signal to the second sampling rate of the corrupted victim signal,
wherein, in a case where the logic determines that power of an aliasing portion of the interfering signal is smaller than a threshold, the low-pass filter and decimator generates a decimated kernel vector by filtering and decimating the kernel vector; and
wherein the logic generates the nonlinear self-interference based on the decimated kernel vector.

* * * * *